Oct. 4, 1966    W. J. BLEASDALE    3,276,477
CUSHIONING MEANS FOR HYDRAULIC SYSTEM
Filed May 9, 1963

*INVENTOR.*
WILLIAM J. BLEASDALE
BY Oldham & Oldham
ATTYS

United States Patent Office 3,276,477
Patented Oct. 4, 1966

3,276,477
CUSHIONING MEANS FOR HYDRAULIC SYSTEM
William J. Bleasdale, 17834 Rosecliff Road,
Cleveland, Ohio
Filed May 9, 1963, Ser. No. 279,181
6 Claims. (Cl. 138—30)

This invention relates to a cushioning means for a hydraulic system, and more particularly to a new and improved accumulator, or other article, to substantially lessen pressure shocks caused in a hydraulic systems due to pumping means, and sudden pressure changes.

Heretofore it has been known that there are many and varied types of accumulators to perform various functions in pressure systems. Conventional accumulators usually consist of a container divided by an elastic partition or diaphragm into two chambers one of which is intended to receive a gas under a preload pressure, the other one to receive, store or deliver a fluid, usually a liquid, according to the instantaneous fluid pressure prevailing in the hydraulic system. The performance of the accumulator essentially depends on the ratio of the preload gas pressure to the maximum line pressure of the system, and performance of this ratio is almost totally dependent on the means available to easily and smoothly transmit the pressure differential between the preload gas pressure and the line pressure in the system. In the past, this has been accomplished by utilizing, directly connected to the hydraulic line, a rigid pipe-like member having a plurality of holes therein, with the elastic partition or diaphragm separating this pipe-like member from the air pressure chamber. Thus, under operation, the fluid pressure change passing through the holes in the pipe-like member is very slow, and inefficient. Further, the elastic partition or diaphragm tends to force itself into the holes when the line pressure is low thereby causing damage and rupture to the elastic partition or diaphragm. Thus, in the conventional system, the pressure cushioning is slow, jerky, and inefficient, and the possibility always exists that when the line pressure is exceedingly low, the diaphragm will rupture because it is forced into the holes in the rigid pipe-like member.

It is the general object of the present invention to avoid and overcome the foregoing difficulties and other objections to prior art practices by the provisions of a cushioning means for hydraulic systems which utilizes an improved structural relation between the elastic partition or diaphragm and the hydraulic line to provide a highly effective fluid cushioning means to eliminate shocks to hydraulic lines caused by abrupt pressure changes in fluid systems resultant from valve action, pumping means, or other causes, and which structural changes are simple, inexpensive, durable, and highly effective.

A further object of the invention is to provide an improved cushioning means for hydraulic systems which includes a floating closely spaced, helically wound coil-like member in, or connected to the hydraulic fluid pressure line, which member lies coaxially inside a flexible elastic partition or diaphragm to effect smooth, but rapid, pressure changes between the line and the diaphragm, and which floating action and closely spaced helical relation of the convolutions of this coil-like member substantially reduce the possibility of diaphragm rupture if the diaphragm comes in contact with the coil-like member due to low hydraulic pressure.

A further object of the invention is to provide an accumulator which will effect superior hydraulic cushioning and/or pressure maintenance action, which accumulator is smoothly and rapidly responsive, and which accumulator is highly durable, of uncomplicated construction, and inexpensive.

The aforesaid objects of the invention and other objects which will become apparent as the description proceeds are achieved by providing in an accumulator or means in a hydraulic system, the combination of a substantially cylindrical open ended container, a flexible tubular diaphragm of elastic material coaxially arranged within the container, pipe-like connecting means telescopically received in the container at each end thereof, seal means positioned between the connecting means and the container, a helically wound metal coil means extending coaxially inside the diaphragm and operatively carried at each end in floating engagement with the connecting means, clamp means sealing the ends of the diaphragm to the connecting means so as to define a continuous conduit through the container, and means to pass gas into the container between the outer surface of the diaphragm and the inner surface of the container.

For a better understanding of the invention, reference should be had to the accompanying drawings, wherein.

Although the principles of the invention are broadly applicable to any means, or an accumulator which may have only one end thereof connected to a hydraulic pressure line for shock absorbing action, it also relates to means functioning as a thermal compensator, or as a leakage compensator, and the apparatus and means of the invention are usually employed as an accumulator connected at both ends to a hydraulic pressure line. Hence, the invention has been so illustrated and will be so described.

Figure 1:
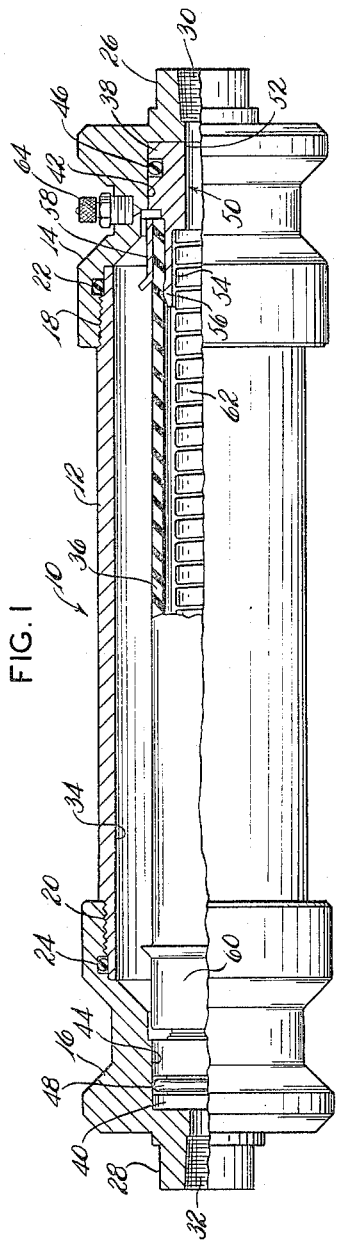
FIGURE 1 is a parially longitudinally sectioned, partially broken away elevation of one embodiment of the invention.
Figure 3:
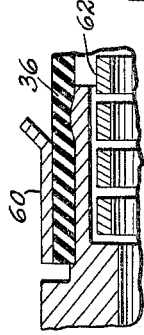
FIG. 3 is a fragmentary enlarged vertical section of an end portion of a coil spring of the accumulator of FIG. 1.

With specific reference to the form of the invention illustrated in FIGURE 1 of the drawings, the numeral 10 indicates generally as apparatus that may be termed an accumulator comprising a tubular body, cylinder or container 12 and two end pieces, or headers 14 and 16 secured to the container 12 as by thread means indicated at 18 and 20, respectively. In order to provide for the required strength, the container 12 and the headers 14 and 16 are preferably made of high strength alloyed steel. However, if it were desired to make the accumulator lightweight, the heads 14 and 16 could be made from other materials, such as high strength aluminum, or aluminum alloyed forgings. A leakproof joint between the container 12 and the headers 14 and 16 may be obtained by providing O-ring seals 22 and 24, or similar means, respectively, between the connected parts, as indicated in FIGURE 1. The invention contemplates that in certain embodiments the container 12 and headers 14 and 16 may be formed as one integral piece.

The headers 14 and 16 have reduced ends 26 and 28, respectively, which provide apertures 30 and 32 for the admission and discharge of the hydraulic liquid from a hydraulic line (not shown) to and from a hydraulic system with which the accumulator is used. The combination of the container 12 and headers 14 and 16 defines a chamber 34.

Coaxially aligned with the container 12 within the chamber 34 is a flexible partition, or tubular diaphragm 36. The diaphragm 36 must have an elasticity to alter its size, preferably without wrinkling, and must be impermeable to the medium, generally air, or an inert gas such as nitrogen, surrounding its outer surface, and the medium, generally hydraulic liquid, contacting its inner surface.

In order to operatively connect the diaphragm 36 to the apertures 30 and 32, a pair of pipe-like connecting members 38 and 40, respectively, are provided. The members 38 and 40 are removably received in counterbored recesses 42 and 44 in the heads 14 and 16, respectively. To achieve a seal between the members 38 and 40 and the heads 14 and 16, O-ring seals 46 and 48, or equivalents, are provided.

As seen in the sectioned portion of FIGURE 1, the bore through the member 38, indicated generally by the numeral 50, is operatively aligned in registry with aperture 30, and consists of a smaller section 52 essentially the same size as the aperture 30, and an enlarged recessed portion 54. For the purpose of securing the diaphragm 36 to the members 38 and 40, an enlarged flange 56 is provided on the radially outward side of the inward ends thereof, as seen on the member 38 in the sectioned portion of FIGURE 1. Pressed clamp bands 58 and 60, or equivalent means, complete the seal of the diaphragm 36 and the members 38 and 40.

A helically wound coil 62 made of a material that may be substantially square or rectangularly shaped in cross section, extends coaxially inside the diaphragm 36 and is operatively carried within each end in the recessed portions indicated by the numeral 54 for the member 38 of the members 38 and 40. The coil 62 has a small limited longitudinal floating action in relation to the members 38 and 40. The coil 62 is preferably wound like a helical spring and has closely spaced adjacent convolutions, and preferably has some spring action. The coil 62 enables fluid pressure to pass rapidly between adjacent convolutions to provide an effective means to transfer pressure rapidly from the hydraulic line (not shown) to a surface of the gas chamber 34, or vice versa. As an important feature of the invention, the coil 62 acts as a frame which limits the inward movement of the diaphragm 36. The radially outward surface of each convolution of the coil 62 is substantially flat to thereby form a smooth and continuous outer surface. Further, the adjacent sides of the helical windings of the coil 62 are uniformly spaced, and very small in relation to the width of each convolution. Therefore, since the outer surfaces of each convolution are flat and the spacing between the convolution is very small, the diaphragm 36 will not be unduly stressed with a localized pressure in any area when the diaphragm 36 is forced against the coil 62 when hydraulic pressure is low, thereby greatly reducing any possibility of rupture or damage to the diaphragm 36. Also, since the coil 62 is floatingly, or freely positioned in the members 38 and 40, it has a limited degree of longitudinal motion, and the position of the coil 62 in relation to the diaphragm 36 may change with pressure changes. Hence, when the diaphragm 36 is forced against the coil 62, it will seldom have contact therewith in the same relative position, thereby further decreasing the possibility of wear in any particular area of contact. Thus, it is seen that the coil 62 provides an excellent frame support for the diaphragm 36, when needed, while also effecting a smooth and continuous pressure transfer between adjacent convolutions of the helical windings to the diaphragm on abrupt pressure changes.

Suitable valve means 64 are secured to the header 14 to supply the chamber 34 with pressure fluid, as desired. Generally, the chamber 34 will be maintained at a pressure slightly lower than the usual hydraulic line pressure to maintain the proper cushioning action desired.

Figure 2:
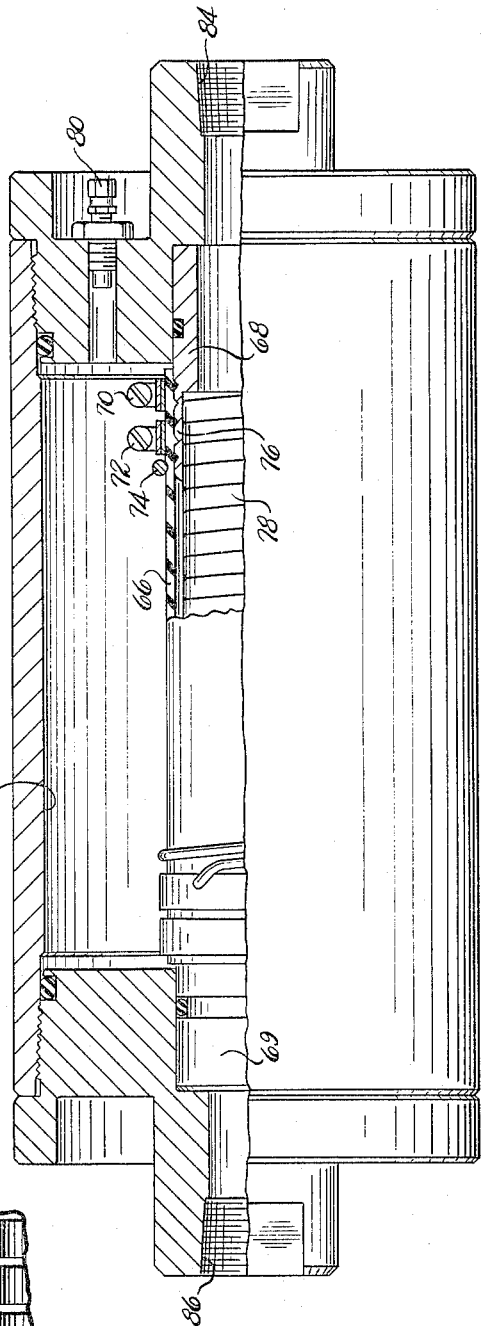
FIGURE 2 is a partially longitudinally sectioned, partially broken away elevation of another embodiment of the invention utilizing a larger air chamber, and a different clamping means for the diaphragm.

The embodiment of the invention shown in FIGURE 2 is essentially the same as that shown in FIGURE 1, except it is of heavier construction, and is designed to operate under higher pressures. In this embodiment, a diaphragm 66 is affixed to connecting members 68 and 69, as indicated for the member 68 in the sectioned portion of the drawings, by means of clamp rings 70 and 72, and spring means 74. Note that an extending lip 76 of the connecting member 68 is indented to achieve a Z or saw tooth seal of the diaphragm 66 and the connecting member 68. Again, a coil 78 provided is essentially the same as the coil 62 in FIGURE 1, and performs the same function by means of the closely spaced flat convolutions and the floating action described heretofore. Valve means 80 are provided to permit gas pressure supply and control in the chamber 82. Again, the accumulator can be placed directly in the hydraulic pressure line by connecting conduits engaging apertures 84 and 86, respectively, in the header plates.

It should be noted, however, that either the accumulator of FIGURE 1 or FIGURE 2 could be placed in a hydraulic pressure line at only one end with the other end capped or sealed, and the purposes and advantages of the invention would still be realized. Further, it should be noted that the connecting members 38 and 40 in FIGURE 1, and 68 and 69 in FIGURE 2 are telescopically positioned so that they may have slight longitudinal movement on expansion and contraction of the resilient diaphragms during accumulator operation.

While the coils 62 and 78 are essentially springs, the invention contemplates use of any similar tubular member having an elongate helical slit provided therein. Such coils or tubular members serve as a support means for the diaphragms when the system pressure is reduced.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In a cushioning means for a hydraulic system the combination of
    a container having open ends,
    headers on each end of the container,
    an aperture through each header,
    seal means between the headers and the container,
    a flexible tube-shaped diaphragm arranged within said container so that the ends of the diaphragm are aligned with said apertures,
    means carried by the headers and aligned with the apertures to connect each end of the diaphragm in sealed relation to the headers, and
    a closely spaced helically wound coil arranged within said diaphragm and supported at each end in longitudinal sliding engagement with said means, said coil having a flat cylindrically shaped outer surface with the axial width of each convolution thereof being substantially greater than the spacing between convolutions, said coil having an outside diameter slightly less than the inner diameter of said diaphragm, and
    means to pass fluid into the container between the outer surface of the bag and the inner surface of the container.

2. In a cushioning means for a hydraulic system the combination of
    a container having open ends,
    headers on each end of the container,
    an aperture through each header,
    seal means between the headers and the container,
    a flexible tube-shaped diaphragm arranged within said container so that the ends of the diaphragm are aligned with said apertures,
    means carried by the headers and aligned with the apertures to connect each end of the diaphragm in sealed relation to the headers,
    a closely spaced convolution helically wound coil arranged within said diaphragm and supported at each end on said means, said coil having an outer diameter of slightly less length than the normal internal diameter of said diaphragm, said coil being made from a member having an axial length in section at least as long as the radial length thereof, means to pass pressure fluid into the container between the outer surface of the bag and the inner surface of the container.

3. In a cushioning means for a hydraulic system the combination of
   a container having closed ends with an aperture through each end,
   a tube-like resilient diaphragm arranged within said container with the ends thereof aligned with an operatively connected and sealed to said apertures as to define a closed conduit from one aperture to the other through the container,
   a helically wound coil arranged within said diaphragm and supported at each end in limited longitudinal sliding engagement with said apertures, said coil having an outer diameter slightly less than the normal inner diameter of said diaphragm, and said coil having a substantially smoothly contoured outer surface with the longitudinal sectional width of the convolution forming members thereof being substantially greater than the spacing between convolutions, said coil having a uniform helical slit formed between the convolutions thereof, and
   means to pass fluid into said container between the outer surface of said diaphragm and the inner surface of the said container.

4. In a cushioning means for a hydraulic system the combination of
   a container having closed ends with an aperture through each end for connection to a hydraulic system,
   a resilient tubular diaphragm arranged within said container with the ends thereof aligned with and operatively connected and sealed to said apertures as to define a closed conduit from one aperture to the other through the container,
   a helically wound coil arranged within said diaphragm and supported at each end in limited longitudinal sliding engagement with said apertures, said coil having an outer diameter slightly less than the normal inner diameter of said diaphragm, said coil having a flat substantially continuous cylindrical outer surface and being made from a member that is square in cross section and is much longer in a longitudinal direction than the spacing between adjacent convolutions of said coil, said coil forming a continuous narrow helical slit extending from end to end thereof between adjacent convolutions of the coil, and
   means to pass fluid into said container between the outer surface of said diaphragm and the inner surface of the said container.

5. In a cushioning means for a hydraulic system the combination of
   a container having an aperture through at least one end thereof for connection to a hydraulic system,
   a resilient tubular diaphragm arranged within said container with an end thereof aligned with and operatively connected and sealed to said aperture, said diaphragm having its other end sealed in relation to said container to define a chamber in said container,
   a helically wound coil spring positioned within said diaphragm, said coil spring having an outer diameter slightly less than the normal inner diameter of said diaphragm, said coil spring having a flat substantially continuous cylindrical outer surface and being made from a member that is substantially rectangular in cross section and is much longer in a longitudinal direction than the spacing between adjacent convolutions of said coil spring, said coil spring forming a continuous narrow helical slot extending from end to end thereof between adjacent convolutions of the coil spring, and
   means to pass pressure fluid into chamber formed between the outer surface of said diaphragm and the inner surface of the said container.

6. Means for use with a fluid system for pressure storage and/or cushioning action with the system and comprising
   a container means connectable to the fluid system to receive pressure fluid therefrom,
   a flexible diaphragm secured to said container means in sealed engagement therewith to form a chamber within said container means sealed from the fluid system,
   valve means carried by said container means and connecting to said chamber for filling said chamber with a gas, and
   coil spring-like support mens for said diaphragm positioned on said container means within said diaphragm, said support means receiving said pressure fluid therein and having an elongate helical slit therein, said support means being made of a member having greater longitudinal length in a section of each convolution thereof than the longitudinal spacing of adjacent convolutions
   said support means being of slightly smaller outer diameter than the inner diameter of said diaphragm, and having a cylindrical outer surface.

References Cited by the Examiner

UNITED STATES PATENTS

| 1,106,633 | 8/1914 | Denehie | 251—336 X |
| 2,353,143 | 7/1944 | Bryant | 92—90 X |
| 2,760,518 | 8/1956 | Peet | 138—30 |
| 2,786,642 | 3/1957 | Comb | 251—5 X |
| 2,838,073 | 6/1958 | Di Mattia et al. | 138—30 |
| 3,945,665 | 7/1960 | Regan et al. | 251—5 X |

FOREIGN PATENTS 989,742  5/1951  France.

LAVERNE D. GEIGER, *Primary Examiner.*

LEWIS J. LENNY, *Examiner.*

T. MOORHEAD, *Assistant Examiner.*